US011049016B2

(12) United States Patent
Ross et al.

(10) Patent No.: US 11,049,016 B2
(45) Date of Patent: *Jun. 29, 2021

(54) NEURAL NETWORK PROCESSOR

(71) Applicant: Google LLC, Mountain View, CA (US)

(72) Inventors: Jonathan Ross, Mountain View, CA (US); Norman Paul Jouppi, Palo Alto, CA (US); Andrew Everett Phelps, Middleton, WI (US); Reginald Clifford Young, Palo Alto, CA (US); Thomas Norrie, Mountain View, CA (US); Gregory Michael Thorson, Waunakee, WI (US); Dan Luu, Madison, WI (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/824,411

(22) Filed: Mar. 19, 2020

(65) Prior Publication Data

US 2020/0218981 A1   Jul. 9, 2020

Related U.S. Application Data

(63) Continuation of application No. 15/686,615, filed on Aug. 25, 2017, now Pat. No. 10,699,188, which is a
(Continued)

(51) Int. Cl.
*G06N 3/08* (2006.01)
*G06F 15/80* (2006.01)
(Continued)

(52) U.S. Cl.
CPC ............ *G06N 3/08* (2013.01); *G06F 15/8046* (2013.01); *G06N 3/063* (2013.01); *G06N 5/04* (2013.01)

(58) Field of Classification Search
None
See application file for complete search history.

(56) References Cited

U.S. PATENT DOCUMENTS 5,014,235 A   5/1991   Morton
5,136,717 A   8/1992   Morley et al.
(Continued)

FOREIGN PATENT DOCUMENTS

CN   104035751   9/2014
EP   0422348     4/1991
(Continued)

OTHER PUBLICATIONS

Ahm Shapri and N.A.Z Rahman "Performance Analysis of Two-Dimensional Systolic Array Matrix Multiplication with Orthogonal Interconnections," International Journal on New Computer Architectures and Their Applications, 1(3), 2001, pp. 1090-1000.
(Continued)

*Primary Examiner* — Alan Chen
(74) *Attorney, Agent, or Firm* — Lerner, David, Littenberg, Krumholz & Mentlik, LLP

(57) ABSTRACT

A circuit for performing neural network computations for a neural network comprising a plurality of neural network layers, the circuit comprising: a matrix computation unit configured to, for each of the plurality of neural network layers: receive a plurality of weight inputs and a plurality of activation inputs for the neural network layer, and generate a plurality of accumulated values based on the plurality of weight inputs and the plurality of activation inputs; and a vector computation unit communicatively coupled to the matrix computation unit and configured to, for each of the plurality of neural network layers: apply an activation func-
(Continued)

tion to each accumulated value generated by the matrix computation unit to generate a plurality of activated values for the neural network layer.

24 Claims, 6 Drawing Sheets

Related U.S. Application Data continuation of application No. 14/844,524, filed on Sep. 3, 2015, now Pat. No. 9,747,546.

(60) Provisional application No. 62/164,931, filed on May 21, 2015.

(51) Int. Cl.
  G06N 3/063 (2006.01)
  G06N 5/04 (2006.01)

(56) References Cited

U.S. PATENT DOCUMENTS

| | | |
|---|---|---|
| 5,138,695 A | 8/1992 | Means |
| 5,146,543 A | 9/1992 | Vassiliadis et al. |
| 5,337,395 A | 8/1994 | Vassiliadis et al. |
| 5,471,627 A | 11/1995 | Means et al. |
| 5,509,106 A | 4/1996 | Pechanek |
| 5,544,336 A | 8/1996 | Kato |
| 5,799,134 A | 8/1998 | Chiueh et al. |
| 5,812,993 A | 9/1998 | Ginosar et al. |
| 5,892,962 A | 4/1999 | Cloutier |
| 6,038,337 A | 3/2000 | Lawrence |
| 6,184,753 B1 | 2/2001 | Ishimi |
| 7,082,419 B1 | 7/2006 | Lightowler |
| 7,136,710 B1 | 11/2006 | Hoffberg |
| 8,184,696 B1 | 5/2012 | Chirila-Rus |
| 8,417,758 B1 | 4/2013 | Rao |
| 8,468,109 B2 | 6/2013 | Moussa et al. |
| 8,924,455 B1 | 12/2014 | Barman et al. |
| 10,699,188 B2 * | 6/2020 | Ross .................. G06F 15/8046 |
| 2005/0044053 A1 | 2/2005 | Moreno |
| 2007/0022063 A1 | 1/2007 | Lightowler |
| 2007/0086655 A1 | 4/2007 | Simard et al. |
| 2008/0319933 A1 | 12/2008 | Moussa |
| 2011/0029471 A1 | 2/2011 | Chakradhar et al. |
| 2014/0142929 A1 | 5/2014 | Seide et al. |
| 2014/0180989 A1 | 6/2014 | Krizhevsky et al. |
| 2014/0288928 A1 | 9/2014 | Penn et al. |
| 2014/0337262 A1 | 11/2014 | Kato et al. |
| 2016/0267111 A1 | 9/2016 | Shoaib |

FOREIGN PATENT DOCUMENTS

| | | |
|---|---|---|
| EP | 3064130 | 9/2016 |
| TW | 201128542 | 8/2011 |
| TW | 201232429 | 8/2012 |
| TW | 201331855 | 8/2013 |

OTHER PUBLICATIONS

Beamer et al., "Ivy Bridge Server Graph Processing Bottlenecks," The First International Workshop Computer Architecture for Machine Learning, Jun. 2015, 56 pages.
Bernnak et al., "VLSI Implementation of a Neural Network Classifier Based on the Saturating Linear Activation Function", 2002, Proceedings of the 9th International Conference on Neural Information Processing (ICONIP'02) ,vol. 2, pp. 981-985.
Bo et al., "String Kernel Testing Acceleration Using Micron's Automata Processor," The First International Workshop Computer Architecture for Machine Learning, Jun. 2015, 21 pages.
Carlo et al., "An Area-Efficient 2-D Convolution Implementation on FPGA for Space Applications," IEEE Computer Society, Dec. 11, 2011, pp. 1-7.
Chen and Li, "Hardware Acceleration for Neuromorphic Computing— An Evolving View," The First International Workshop Computer Architecture for Machine Learning, Jun. 2015, 38 pages.
Chillet et al., "A Neural Network Model for Real-Time Scheduling on Heterogeneous SoC Architectures," Proceedings of International Joint Conference on Neural Networks, Aug. 2007, pp. 102-107.
Cornu et al., "Design, Implementation, and Test of a Multi-Model Systolic Neural-Network Accelerator," Scientific Programming— Parallel Computing Projects of the Swiss Priority Programme, vol. 5, No. 1, Jan. 1, 1996, pp. 47-61, XP055294242.
Dawwd, "The multi 2D systolic design and implementation of Convolutional Neural Networks," 2013 IEEE $20^{th}$ International Conference on Electronics, Circuits, and Systems (ICECS), IEEE, Dec. 8, 2013, pp. 221-224, XP032595248.
Dielman, Sander, Kyle W. Willett, and Joni Dambre. "Rotation-invariant convolutional neural networks for galaxy morphology prediction," Monthly notices of the royal astronomical society, 450.2, 2015, pp. 1441-1459.
Farabet et al., "Hardware Accelerated Convolutional Neural Networks for Synthetic Vision Systems," Circuits and Systems (ISCAS), Proceedings of 2010 IEEE International Symposium on, May-Jun. 2010, pp. 257-260.
Francesco Pazienti, "A Systolic Array for Neural Network Implementation", 1991, IEEE, pp. 981-984.
Ginosar, "Accelerators for Machine Learning of Big Data," The First International Workshop Computer Architecture for Machine Learning, Jun. 2015, 13 pages.
Gokhale, "Enabling Machines to Understand our World," The First International Workshop Computer Architecture for Machine Learning, Jun. 2015, 18 pages.
Graf et al., "A Massively Parallel Digital Learning Processor," Proceedings of the $22^{nd}$ annual conference on Neural Information Processing Systems (NIPS), Dec. 2008, 8 pages, XP055016863.
Hecht et al., "An advanced programmable 2D-convolution chip for, real time image processing," Signal Image and Video Processing, Jun. 1991; [Proceedings of the International Symposium on Circuits and Systems], vol. SYMP. 24, Jun. 11, 1991, pp. 1897-1900, XP010046404.
Indiveri, "Neuromorphic circuits for building autonomous cognitive systems," The First International Workshop Computer Architecture for Machine Learning, Jun. 2015, 37 pages.
International Preliminary Report on Patentability issued in International Application No. PCT/US2016029294, dated Nov. 21, 2017, 7 pages.
International Search Report and Written Opinion in International Application No. PCT/US2016/030515, dated Aug. 25, 2016, 19 pages.
International Search Report and Written Opinion in International Application No. PCT/US2016/030536, dated Aug. 31, 2016, 17 pages.
International Search Report and Written Opinion in International Application No. PCT/US2016/029968, dated Sep. 1, 2016, 14 pages.
International Search Report and Written Opinion in International Application No. PCT/US2016/029294, dated Sep. 1, 2016, 13 pages.
International Search Report and Written Opinion in International Application No. PCT/US2016/029986, dated Sep. 1, 2016, 13 pages.
International Search Report and Written Opinion in International Application No. PCT/US2016/029965, dated Sep. 1, 2016, 13 pages.
Kane, "An instruction systolic array architecture for multiple neural network types," Loughborough University, Doctoral Thesis, Sep. 1998, 315 pages.
Khan and Ling, "Systolic architectures for artificial neural nets," Neural Networks, 1991. 1991 IEEE International Joint Conference on, vol. 1, Nov. 1991, pp. 620-627.
Khan et al., Two-Dimensional Multirate Systolic Array Design for Artificial Neural Networks, 1991, IEEE, pp. 186-193.

(56) References Cited

OTHER PUBLICATIONS

Kim et al. "Efficient Hardware Architecture for Sparse Coding," IEEE Transactions on Signal Processing 62.16, Aug. 15, 2014, 14 pages.

Kim et al., "A Large-Scale Architecture for Restricted Boltzmann Machines," Field-Programmable Custom Computing Machines (FCCM), 2010 18th IEEE Annual International Symposium on, IEEE, May 2, 2010, pp. 201-208, XP031681940.

Krizhevsky et al., "ImageNet classification with deep convolutional neural networks," The 26th annual conference on Neural Information Processing Systems (NIPS'25), Dec. 2012, pp. 1-9, XP55113686.

Kung et al., "Two-level pipelined systolic array for multidimensional convolution," Image and Vision Computing, Elsevier, vol. 1, No. 1, Feb. 2, 1983, pp. 30-36, XP024237511.

Kung, "VLSI Array Processors," IEEE ASSP Magazine, IEEE, vol. 2, No. 3, Jul. 1, 1985, pp. 4-22, XP011370547.

Lee and Song, "Implementation of the Super-Systolic Array for Convolution," Design Automation Conference, 2003. Proceedings of the ASP-DAC 2003. Asia and South Pacific, Jan. 2003, pp. 491-494.

Lee, Yim-Kul, and William T Rhodes. "Nonlinear image processing by a rotating kernel transformation," Optics letters 15.23, 1990, pp. 1383-1385.

Lehmann et al., "A generic systolic array building block for neural networks with on-chip learning," Neural Networks, IEEE Transactions on, 4(3):400-407, May 1993.

Lipasti et al., Mimicking the Self-Organizing Properties of the Visual Cortex, The First International Workshop Computer Architecture for Machine Learning, Jun. 2015, 23 pages.

Lo, Shih-Chung B., et al. "Artificial convolutional neural network for medical image pattern recognition," Neural networks 8.7, 1995, pp. 1201-1214.

Mahapatra et al., "Mapping of Neural Network Models onto Systolic Arrays," Journal of Parallel and Distributed Computing 60, 677-689, Jan. 2000.

Merolla et al. "A digital Neurosynaptic Core Using Embedded Crossbar Memory with 45pJ per Spike in 45nm," IEEE CICC, Sep. 19, 2011, 4 pages.

Office Action in Taiwanese Application No. 105115859, dated Nov. 16, 2016, 10 pages.

Ovtcharov et al., "Accelerating Deep Convolutional Neural Networks Using Specialized Hardware in the Datacenter," The First International Workshop Computer Architecture for Machine Learning, Jun. 2015, 33 pages.

Patil et al., "Hardware Architecture for Large Parallel Array of Random Feature Extractors applied to Image Recognition," Dec. 24, 2015, arXiv:1512.07783v1, 18 pages, XP055296121.

Pearce, "You Have No (Predictive) Power Here, SPEC!" The First International Workshop Computer Architecture for Machine Learning, Jun. 2015, 15 pages.

Rojas, "Hardware for Neural Networks," Neural Networks, Springer-Verlag, Berlin, 1996, pp. 451-478.

Shaaban, "Systolic Architectures," PowerPoint Presentation, Mar. 2003, 9 pages.

Shapri and Rahman, "Performance Analysis of Two-Dimensional Systolic Array Matrix Multiplication with Orthogonal Interconnections," International Journal on New Computer Architectures and Their Applications (IJNCAA) 1(3):1066-1075, Dec. 2011.

Smith, "Biologically Plausible Spiking Neural Networks," The First International Workshop Computer Architecture for Machine Learning, Jun. 2015, 77 pages.

Sudha et al., "Systolic array realization of a neural network-based face recognition system," Industrial Electronics and Applications, 2008, ICIEA 2008, 3rd IEEE Conference on, pp. 1864-1869, Jun. 2009.

TW Office Action in Taiwanese Application No. 107113688, dated Jan. 14, 2020, 20 pages (with English translation).

Wong et al., "A New Scalable Systolic Array Processor Architecture for Discrete Convolution," College of Engineering at the University of Kentucky, Master Thesis, 2003, 175 pages.

Wu et al., "Flip-Rotate-Pooling Convolution and Split Dropout on Convolution Neural Networks for Image Classification," Jul. 31, 2015, arXiv:1507.08754v1, pp. 1-9, XP055296122.

Yiping et al. "A High Performance Digital Neural Processor Design by Network on Chip Architecture" IEEE VLSI Design, Automation and Test, Apr. 25, 2011, 4 pages.

U.S. Non-Final Office Action in U.S. Appl. No. 16/529,782, dated Oct. 25, 2019, 23 pages.

U.S. Final Office Action in U.S. Appl. No. 16/529,782, dated Feb. 24, 2020, 19 pages.

U.S. Non-Final Office Action in U.S. Appl. No. 16/529,782, dated Oct. 8, 2020, 24 pages.

U.S. Non-Final Office Action in U.S. Appl. No. 16/663,876, dated Jan. 29, 2020, 32 pages.

U.S. Final Office Action in U.S. Appl. No. 16/663,876, dated May 11, 2020, 32 pages.

U.S. Advisory Action in U.S. Appl. No. 16/663,876, dated May 11, 2020, 3 pages.

U.S. Non-Final Office Action in U.S. Appl. No. 16/663,876, dated Dec. 2, 2020, 28 pages.

Kung et al., "Digital VLSI Architectures for Neural Networks," in IEEE Intl Symp. Circuits and Systems, 1989, pp. 445-448.

Ovtcharov et al., "Accelerating Deep Convolutional Neural Networks Using Specialized Hardware," Microsoft Research, [online] [retrieved Mar. 25, 2021]. Retrieved from the Internet: <URL:http://www.microsoft.com/en-us/research/wp-content/uploads/2016/02/CNN20Whitepaper.pdf>, Feb. 22, 2015, 4 pages.

Ovtcharov et al, "Accelerating Deep Convolutional Neural Networks Using Specialized Hardware" Microsoft Research, Feb. 2015, 4 pages.

\* cited by examiner

NEURAL NETWORK PROCESSOR

CROSS REFERENCE TO RELATED APPLICATIONS

This application is a continuation of U.S. application Ser. No. 15/686,615, filed on Aug. 25, 2017, which is a continuation of U.S. application Ser. No. 14/844,524, filed on Sep. 3, 2015, which is a non-provisional of and claims priority to U.S. Provisional Patent Application No. 62/164,931, filed on May 21, 2015, the entire contents of which are hereby incorporated by reference.

BACKGROUND

This specification relates to computing neural network inferences in hardware.

Neural networks are machine learning models that employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

SUMMARY

In general, this specification describes a special-purpose hardware circuit that computes neural network inferences.

In general, one innovative aspect of the subject matter described in this specification can be embodied in a circuit for performing neural network computations for a neural network comprising a plurality of neural network layers, the circuit comprising: a matrix computation unit configured to, for each of the plurality of neural network layers: receive a plurality of weight inputs and a plurality of activation inputs for the neural network layer, and generate a plurality of accumulated values based on the plurality of weight inputs and the plurality of activation inputs; and a vector computation unit communicatively coupled to the matrix computation unit and configured to, for each of the plurality of neural network layers: apply an activation function to each accumulated value generated by the matrix computation unit to generate a plurality of activated values for the neural network layer.

Implementations can include one or more of the following features. A unified buffer communicatively coupled to the matrix computation unit and the vector computation unit, where the unified buffer is configured to receive and store output from the vector computation unit, and the unified buffer is configured to send the received output as input to the matrix computation unit. A sequencer configured to receive instructions from a host device and generate a plurality of control signals from the instructions, where the plurality of control signals control dataflow through the circuit; and a direct memory access engine communicatively coupled to the unified buffer and the sequencer, where the direct memory access engine is configured to send the plurality of activation inputs to the unified buffer, where the unified buffer is configured to send the plurality of activation inputs to the matrix computation unit, and where the direct memory access engine is configured to read result data from the unified buffer. A memory unit configured to send the plurality of weight inputs to the matrix computation unit, and where the direct memory access engine is configured to send the plurality of weight inputs to the memory unit. The matrix computation unit is configured as a two-dimensional systolic array comprising a plurality of cells. The plurality of weight inputs is shifted through a first plurality of cells along a first dimension of the systolic array, and the plurality of activation inputs is shifted through a second plurality of cells along a second dimension of the systolic array. For a given layer in the plurality of layers, a count of the plurality of activation inputs is greater than a size of the second dimension of the systolic array, and the systolic array is configured to: divide the plurality of activation inputs into portions, where each portion has a size less than or equal to the size of the second dimension; generating, for each portion, a respective portion of accumulated values; and combining each portion of accumulated values to generate a vector of accumulated values for the given layer. For a given layer in the plurality of layers, a count of the plurality of weight inputs is greater than a size of the first dimension of the systolic array, and where the systolic array is configured to: divide the plurality of weight inputs into portions, where each portion has a size less than or equal to the size of the first dimension; generate, for each portion, a respective portion of accumulated values; and combine each portion of accumulated values to generate a vector of accumulated values for the given layer. Each cell in the plurality of cells comprises: a weight register configured to store a weight input; an activation register configured to store an activation input and configured to send the activation input to another activation register in a first adjacent cell along the second dimension; a sum-in register configured to store a previously summed value; multiplication circuitry communicatively coupled to the weight register and the activation register, where the multiplication circuitry is configured to output a product of the weight input and the activation input; and summation circuitry communicatively coupled to the multiplication circuitry and the sum-in register, where the summation circuitry is configured to output a sum of the product and the previously summed value, and where the summation circuitry is configured to send the sum to another sum-in register in a second adjacent cell along the first dimension. One or more cells in the plurality of cells are each configured to store the respective sum in a respective accumulator unit, where the respective sum is an accumulated value. The first dimension of the systolic array corresponds to columns of the systolic array and the second dimension of the systolic array corresponds to rows of the systolic array. The vector computation unit normalizes each activated value to generate a plurality of normalized values. The vector computation unit pools one or more activated values to generate a plurality of pooled values.

Particular embodiments of the subject matter described in this specification can be implemented so as to realize one or more of the following advantages. Implementing a neural network processor in hardware improves efficiency, e.g., by increasing speed and throughput and reducing power and cost, over implementations in software. This can be useful for inference applications. Integrating components of the neural network processor into one circuit allows inferences to be computed without incurring penalties of off-chip communication. Additionally, the circuit can process neural network layers that have a number of inputs, e.g., a number of weight inputs or a number of activation inputs, larger than a size of a dimension of a matrix computation unit within the circuit. For example, the circuit can process a large number of weight inputs per neuron of the neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A neural network having multiple layers can be used to compute inferences. For example, given an input, the neural network can compute an inference for the input. The neural network computes this inference by processing the input through each of the layers of the neural network. In particular, the layers of the neural network are arranged in a sequence, each with a respective set of weights. Each layer receives an input and processes the input in accordance with the set of weights for the layer to generate an output.

Therefore, in order to compute an inference from a received input, the neural network receives the input and processes it through each of the neural network layers in the sequence to generate the inference, with the output from one neural network layer being provided as input to the next neural network layer. Data inputs to a neural network layer, e.g., either the input to the neural network or the outputs of the layer below the layer in the sequence, to a neural network layer can be referred to as activation inputs to the layer.

In some implementations, the layers of the neural network are arranged in a directed graph. That is, any particular layer can receive multiple inputs, multiple outputs, or both. The layers of the neural network can also be arranged such that an output of a layer can be sent back as an input to a previous layer.

Figure 1:
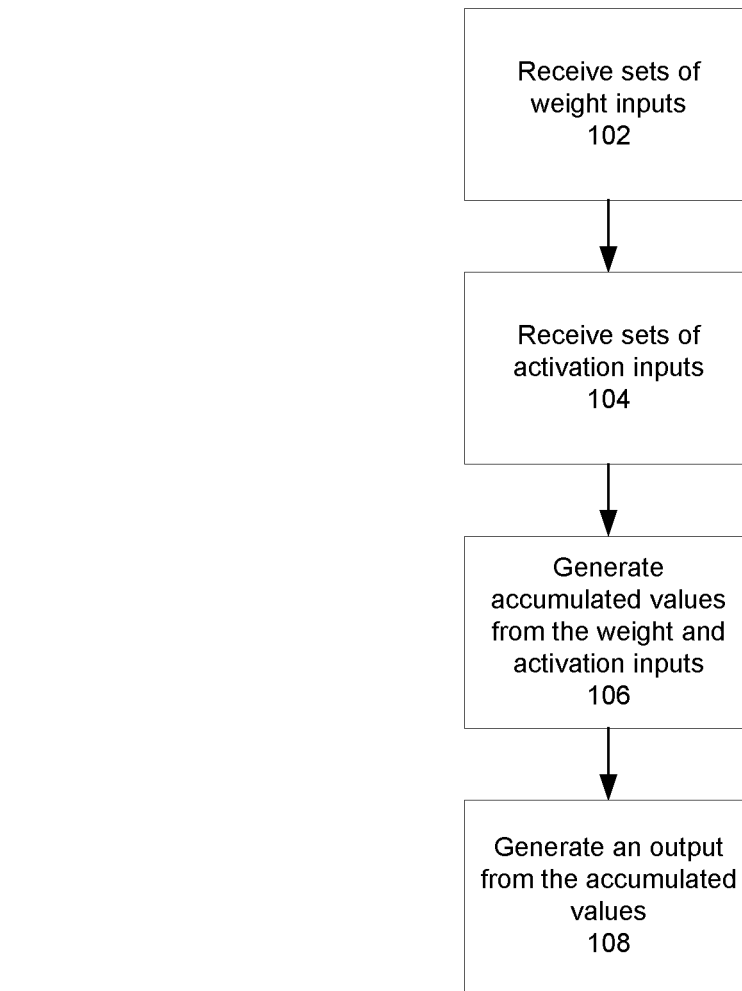
FIG. 1 is a flow diagram of an example method for performing a computation for a given layer of a neural network.

FIG. 1 is a flow diagram of an example process 100 for performing a computation for a given layer of a neural network using a special-purpose hardware circuit. For convenience, the method 100 will be described with respect to a system having one or more circuits that performs the method 100. The method 100 can be performed for each layer of the neural network in order to compute an inference from a received input.

The system receives sets of weight inputs (step 102) and sets of activation inputs (step 104) for the given layer. The sets of weight inputs and the sets of activation inputs can be received from dynamic memory and a unified buffer, respectively, of the special-purpose hardware circuit. In some implementations, both the sets of weight inputs and the sets of activation inputs can be received from the unified buffer.

The system generates accumulated values from the weight inputs and the activation inputs using a matrix multiplication unit of the special-purpose hardware circuit (step 106). In some implementations, the accumulated values are dot products of the sets of weight inputs and the sets of activation inputs. That is, for one set of weights, the system can multiply each weight input with each activation input and sum the products together to form an accumulated value. The system can then compute dot products of other sets of weights with other sets of activation inputs.

The system can generate a layer output from the accumulation values (step 108) using a vector computation unit of the special-purpose hardware circuit. In some implementations, the vector computation unit applies an activation function to the accumulated values, which will be described further below in reference to FIG. 5. The output of the layer can be stored in the unified buffer for use as an input to a subsequent layer in the neural network or can be used to determine the inference. The system finishes processing the neural network when a received input has been processed through each layer of the neural network to generate the inference for the received input.

Figure 2:
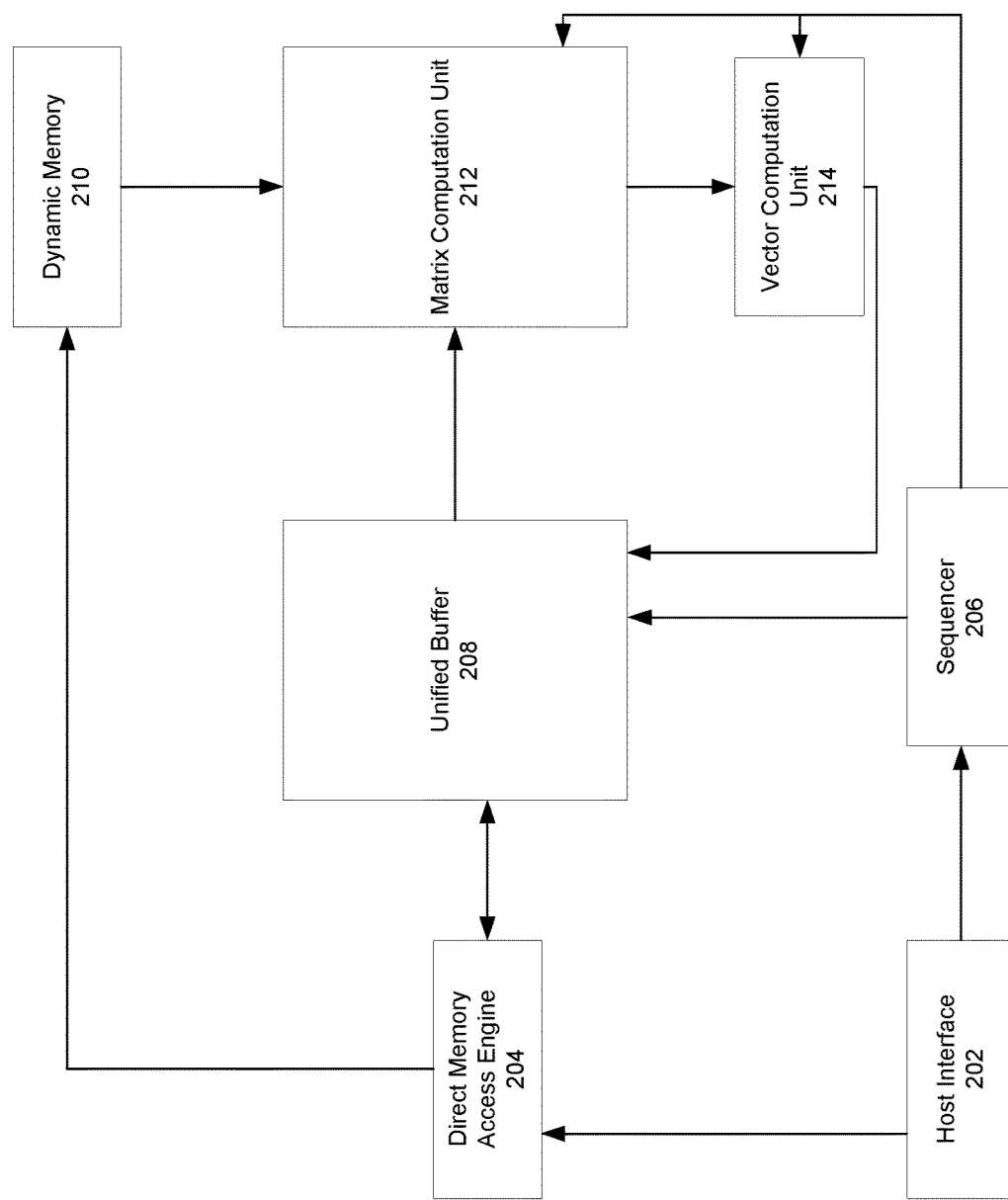
FIG. 2 shows an example neural network processing system.

FIG. 2 shows an example special-purpose integrated circuit 200 for performing neural network computations. The system 200 includes a host interface 202. The host interface 202 can receive instructions that include parameters for a neural network computation. The parameters can include at least one or more of the following: how many layers should be processed, corresponding sets of weight inputs for each layer of the layers, an initial set of activation inputs, i.e., the input to the neural network from which the inference is to be computed, corresponding input and output sizes of each layer, a stride value for the neural network computation, and a type of layer to be processed, e.g., a convolutional layer or a fully connected layer.

The host interface 202 can send the instructions to a sequencer 206, which converts the instructions into low level control signals that control the circuit to perform the neural network computations. In some implementations, the control signals regulate dataflow in the circuit, e.g., how the sets of weight inputs and the sets of activation inputs flow through the circuit. The sequencer 206 can send the control signals to a unified buffer 208, a matrix computation unit 212, and a vector computation unit 214. In some implementations, the sequencer 206 also sends control signals to a direct memory access engine 204 and dynamic memory 210. In some implementations, the sequencer 206 is a processor that generates clock signals. The sequencer 206 can use timing of the clock signals to, at appropriate times, send the control signals to each component of the circuit 200. In some other implementations, the host interface 202 passes in a clock signal from an external processor.

The host interface 202 can send the sets of weight inputs and the initial set of activation inputs to the direct memory access engine 204. The direct memory access engine 204 can store the sets of activation inputs at the unified buffer 208. In some implementations, the direct memory access stores the sets of weights to dynamic memory 210, which can be a memory unit. In some implementations, the dynamic memory is located off of the circuit.

The unified buffer 208 is a memory buffer. It can be used to store the set of activation inputs from the direct memory access engine 204 and outputs of the vector computation unit 214. The vector computation unit will be described in more detail below with reference to FIG. 5. The direct memory access engine 204 can also read the outputs of the vector computation unit 214 from the unified buffer 208.

The dynamic memory 210 and the unified buffer 208 can send the sets of weight inputs and the sets of activation inputs, respectively, to the matrix computation unit 212. In some implementations, the matrix computation unit 212 is a two-dimensional systolic array. The matrix computation unit 212 can also be a one-dimensional systolic array or other circuitry that can perform mathematical operations, e.g., multiplication and addition. In some implementations, the matrix computation unit 212 is a general purpose matrix processor.

The matrix computation unit 212 can process the weight inputs and the activation inputs and provide a vector of outputs to the vector computation unit 214. In some implementations, the matrix computation unit sends the vector of outputs to the unified buffer 208, which sends the vector of outputs to the vector computation unit 214. The vector computation unit can process the vector of outputs and store a vector of processed outputs to the unified buffer 208. The vector of processed outputs can be used as activation inputs to the matrix computation unit 212, e.g., for use in a subsequent layer in the neural network. The matrix computation unit 212 and the vector computation unit 214 will be described in more detail below with reference to FIG. 3 and FIG. 5, respectively.

Figure 3:
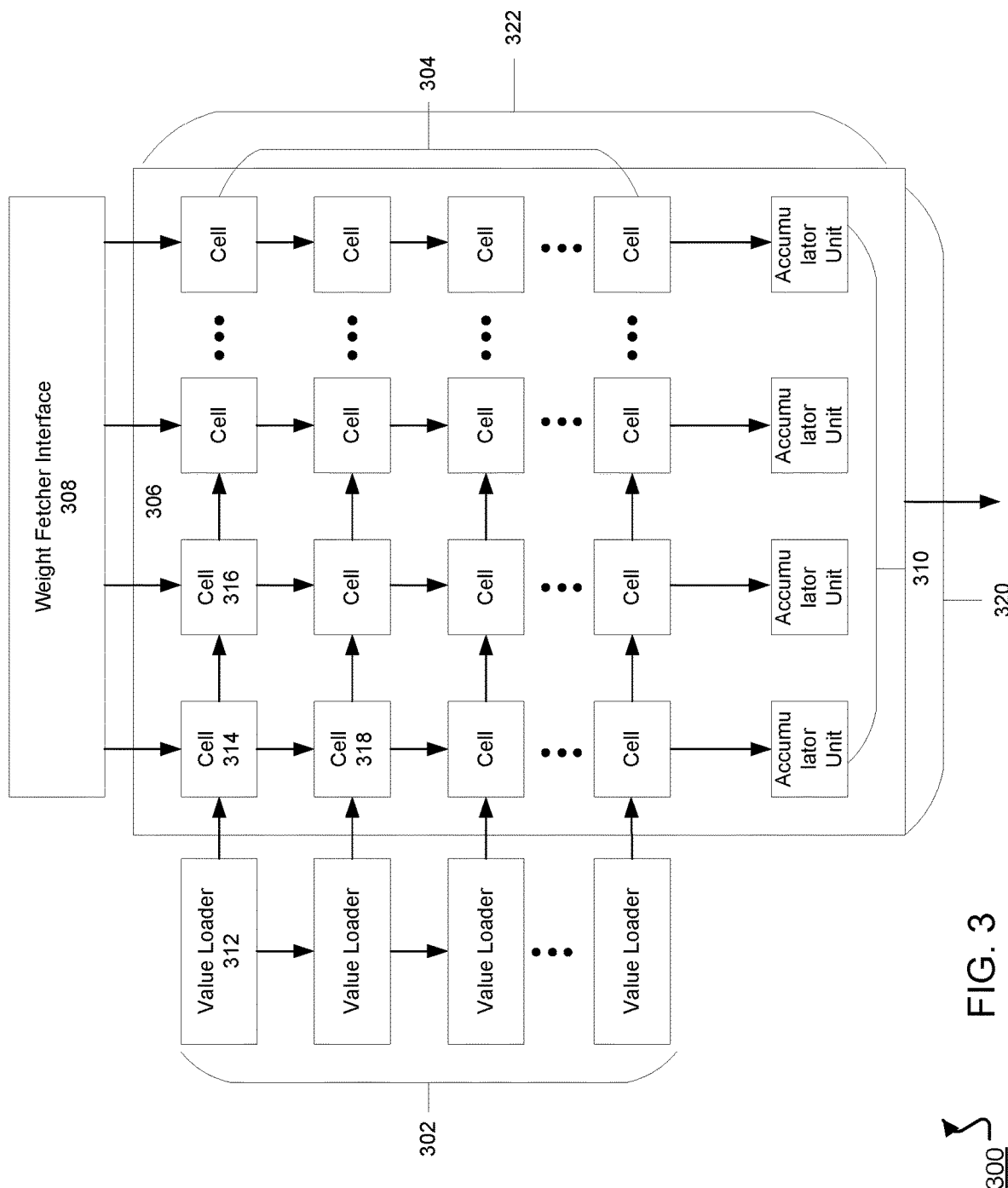
FIG. 3 shows an example architecture including a matrix computation unit.

FIG. 3 shows an example architecture 300 including a matrix computation unit. The matrix computation unit is a two-dimensional systolic array 306. The two-dimensional systolic array 306 can be a square array. The array 306 includes multiple cells 304. In some implementations, a first dimension 320 of the systolic array 306 corresponds to columns of cells and a second dimension 322 of the systolic array 306 corresponds to rows of cells. The systolic array can have more rows than columns, more columns than rows, or an equal number of columns and rows.

In the illustrated example, value loaders 302 send activation inputs to rows of the array 306 and a weight fetcher interface 308 sends weight inputs to columns of the array 306. In some other implementations, however, activation inputs are transferred to the columns and weight inputs are transferred to the rows of the array 306.

The value loaders 302 can receive the activation inputs from a unified buffer, e.g., the unified buffer 208 of FIG. 2. Each value loader can send a corresponding activation input to a distinct left-most cell of the array 306. The left-most cell can be a cell along a left-most column of the array 306. For example, value loader 312 can send an activation input to cell 314. The value loader can also send the activation input to an adjacent value loader, and the activation input can be used at another left-most cell of the array 306. This allows activation inputs to be shifted for use in another particular cell of the array 306.

The weight fetcher interface 308 can receive the weight input from a memory unit, e.g., the dynamic memory 210 of FIG. 2. The weight fetcher interface 308 can send a corresponding weight input to a distinct top-most cell of the array 306. The top-most cell can be a cell along a top-most row of the array 306. For example, the weight fetcher interface 308 can send weight inputs to cells 314 and 316.

In some implementations, a host interface, e.g., the host interface 202 of FIG. 2, shifts activation inputs throughout the array 306 along one dimension, e.g., to the right, while shifting weight inputs throughout the array 306 along another dimension, e.g., to the bottom. For example, over one clock cycle, the activation input at cell 314 can shift to an activation register in cell 316, which is to the right of cell 314. Similarly, the weight input at cell 316 can shift to a weight register at cell 318, which is below cell 314.

On each clock cycle, each cell can process a given weight input and a given activation input to generate an accumulated output. The accumulated output can also be passed to an adjacent cell along the same dimension as the given weight input. An individual cell is described further below with reference to FIG. 4.

The accumulated output can be passed along the same column as the weight input, e.g., towards the bottom of the column in the array 306. In some implementations, at the bottom of each column, the array 306 can include accumulator units 310 that store and accumulate each accumulated output from each column when performing calculations with layers having more weight inputs than columns or layers having more activation inputs than rows. In some implementations, each accumulator unit stores multiple parallel accumulations. This will be described further below with reference to FIG. 6. The accumulator units 310 can accumulate each accumulated output to generate a final accumulated value. The final accumulated value can be transferred to a vector computation unit, e.g., the vector computation unit 502 of FIG. 5. In some other implementations, the accumulator units 310 pass the accumulated values to the vector computation unit without performing any accumulations when processing layers with fewer weight inputs than columns or layers having fewer activating inputs than rows.

Figure 4:
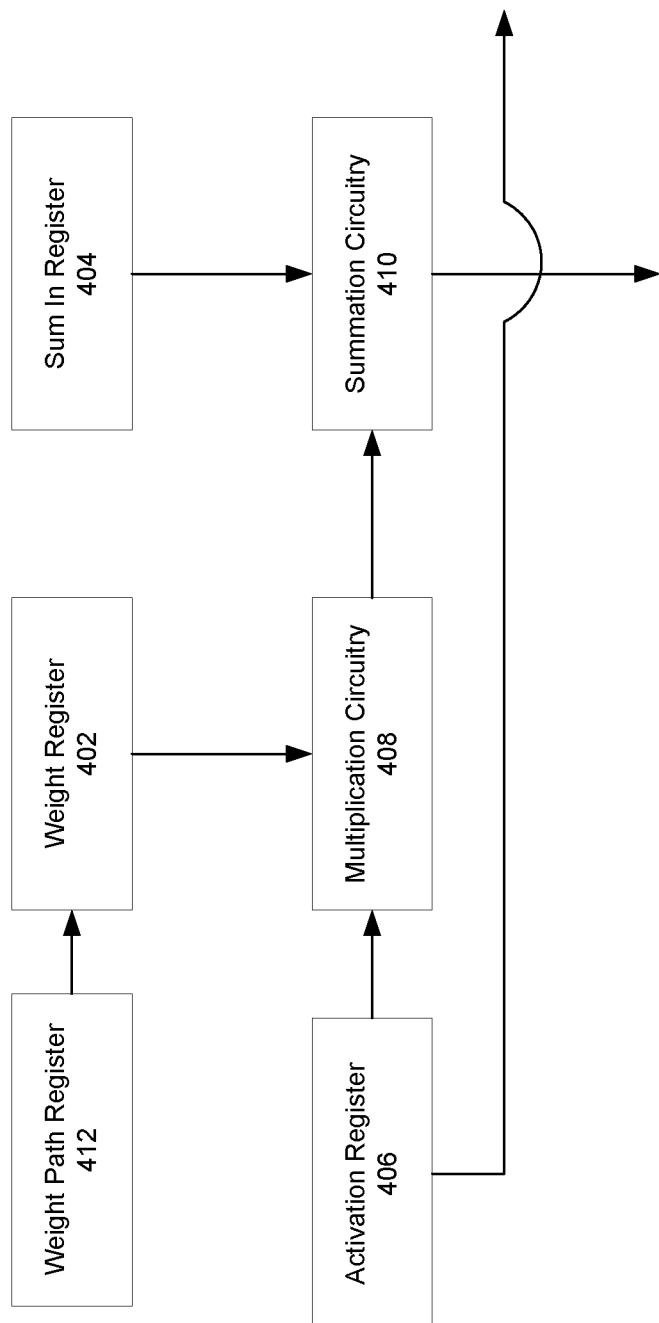
FIG. 4 shows an example architecture of a cell inside a systolic array.

FIG. 4 shows an example architecture 400 of a cell inside a systolic array, e.g., the systolic array 306 of FIG. 3.

The cell can include an activation register 406 that stores an activation input. The activation register can receive the activation input from a left adjacent cell, i.e., an adjacent cell located to the left of the given cell, or from a unified buffer, depending on the position of the cell within the systolic array. The cell can include a weight register 402 that stores a weight input. The weight input can be transferred from a top adjacent cell or from a weight fetcher interface, depending on the position of the cell within the systolic array. The cell can also include a sum in register 404. The sum in register 404 can store an accumulated value from the top adjacent cell. Multiplication circuitry 408 can be used to multiply the weight input from the weight register 402 with the activation input from the activation register 406. The multiplication circuitry 408 can output the product to summation circuitry 410.

The summation circuitry can sum the product and the accumulated value from the sum in register 404 to generate a new accumulated value. The summation circuitry 410 can then send the new accumulated value to another sum in register located in a bottom adjacent cell. The new accumulated value can be used as an operand for a summation in the bottom adjacent cell.

The cell can also shift the weight input and the activation input to adjacent cells for processing. For example, the weight register 402 can send the weight input to another weight register in the bottom adjacent cell. The activation register 406 can send the activation input to another activation register in the right adjacent cell. Both the weight input and the activation input can therefore be reused by other cells in the array at a subsequent clock cycle.

In some implementations, the cell also includes a control register. The control register can store a control signal that determines whether the cell should shift either the weight input or the activation input to adjacent cells. In some implementations, shifting the weight input or the activation input takes one or more clock cycles. The control signal can also determine whether the activation input or weight inputs are transferred to the multiplication circuitry 408, or can determine whether the multiplication circuitry 408 operates on the activation and weight inputs. The control signal can also be passed to one or more adjacent cells, e.g., using a wire.

In some implementations, weights are pre-shifted into a weight path register 412. The weight path register 412 can receive the weight input, e.g., from a top adjacent cell, and transfer the weight input to the weight register 402 based on the control signal. The weight register 402 can statically store the weight input such that as activation inputs are transferred to the cell, e.g., through the activation register 406, over multiple clock cycles, the weight input remains within the cell and is not transferred to an adjacent cell. Therefore, the weight input can be applied to multiple activation inputs, e.g., using the multiplication circuitry 408, and respective accumulated values can be transferred to an adjacent cell.

Figure 5:
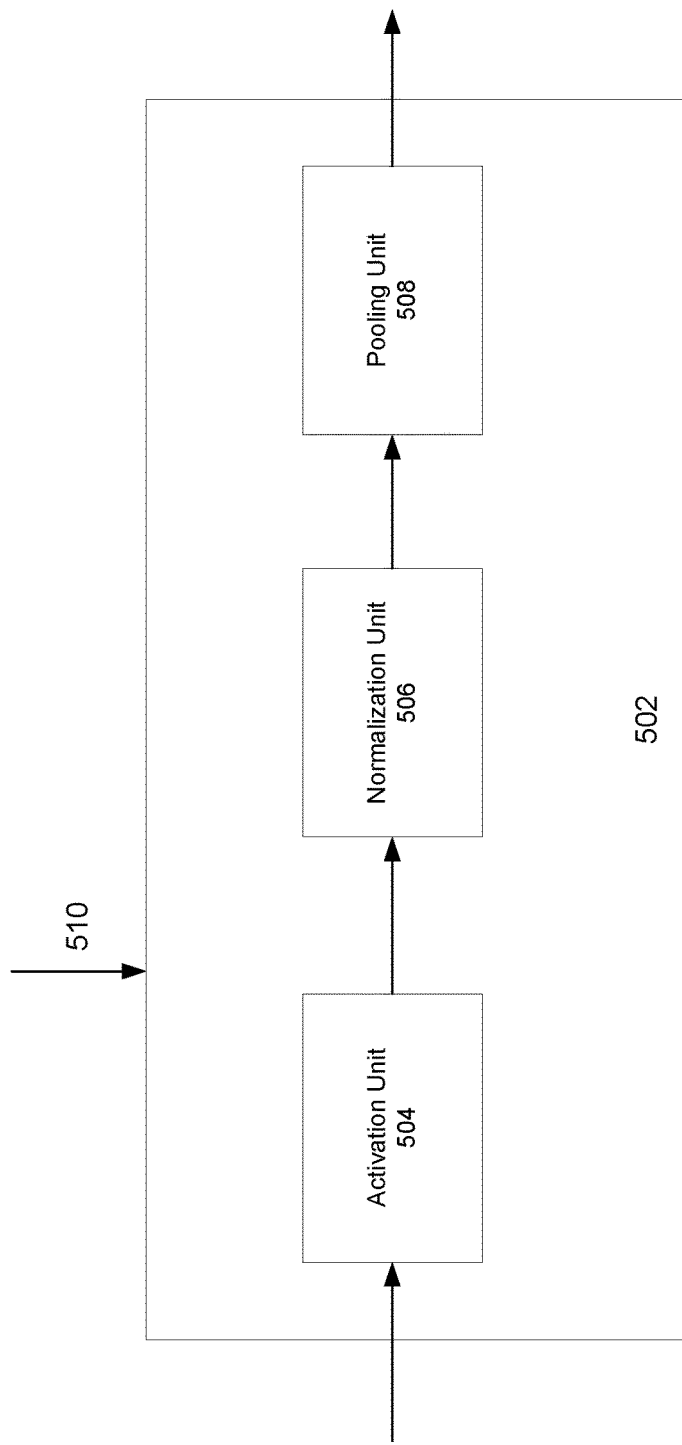
FIG. 5 shows an example architecture of a vector computation unit.

FIG. 5 shows an example architecture 500 of a vector computation unit 502. The vector computation unit 502 can receive a vector of accumulated values from a matrix computation unit, e.g., the matrix computation unit described in reference to FIG. 2.

The vector computation unit 502 can process the vector of accumulated values at the activation unit 504. In some implementations, the activation unit includes circuitry that applies a non-linear function to each accumulated value to generate activation values. For example, the non-linear function can be tanh(x), where x is an accumulated value.

Optionally, the vector computation unit 502 can normalize the activation values in a normalization unit 506 that generates normalized values from the activation values.

Also optionally, the vector computation unit 502 can pool values, either activation values or normalization values, using a pooling unit 508. The pooling unit 508 can apply an aggregation function to one or more of the normalized values to generate pooled values. In some implementations, the aggregation functions are functions that return a maximum, minimum, or average of the normalized values or of a subset of the normalized values.

Control signals 510 can be transferred, e.g., by the sequencer 206 of FIG. 2, and can regulate how the vector computation unit 502 processes the vector of accumulated values. That is, the control signals 510 can regulate whether the activation values are pooled, normalized, or both. The control signals 510 can also specify the activation, normalization, or pooling functions, as well as other parameters for normalization and pooling, e.g., a stride value.

The vector computation unit 502 can send values, e.g., activation values, normalized values, or pooled values, to a unified buffer, e.g., the unified buffer 208 of FIG. 2.

In some implementations, the pooling unit 508 receives the activation values instead of the normalization unit 506, and the pooling unit 508 sends the pooled values to the normalization unit 506, which generates normalized values to be stored in the unified buffer.

Figure 6:
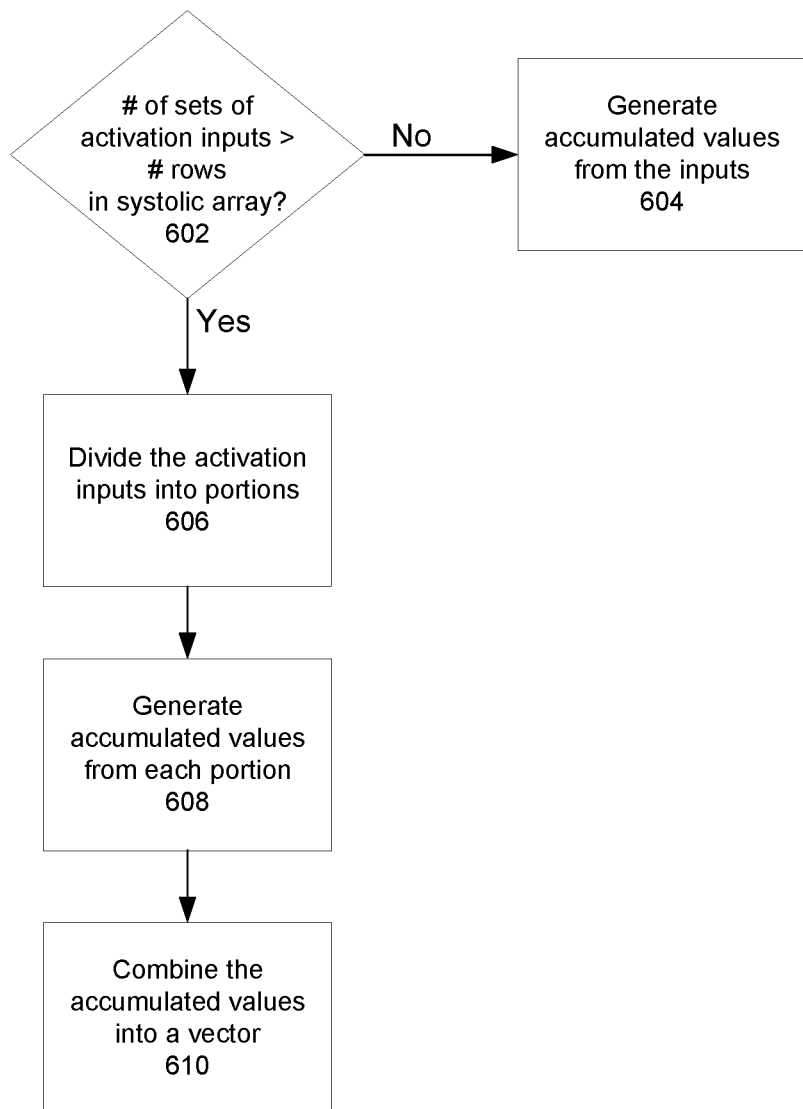
FIG. 6 is a flow diagram of another example process for performing, using a systolic array, the computation for a given neural network layer having more activation inputs than rows in the systolic array.

FIG. 6 is a flow diagram of an example process for performing, using a systolic array, the computation for a given neural network layer having more activation inputs than rows in the systolic array. For convenience, the process 600 will be described with respect to a system that performs the process 600. In some implementations, a host interface or a sequencer performs the process 600, e.g., the host interface 202 or the sequencer 206, respectively, of FIG. 2. In some other implementations, the host interface receives instructions from an external processor that performs the process 600.

As described above, each layer can have multiple sets of activation inputs and each set of weight inputs can be transferred to cells at distinct rows of the array. In some implementations, some layers of the neural network have more sets of activation inputs than there are rows of the array.

The system can determine, e.g., using a comparator, whether there are more sets of activation inputs for the given neural network layer than there are rows in the systolic array. In some implementations, the system makes the determination at compile time. A set of activation inputs can correspond to the activation inputs provided to a single row of the array.

If there are more rows than sets of activation inputs (step 602), the system can generate accumulated values as described above in the systolic array 306 of FIG. 3 (step 604).

If there are more sets of activation inputs to be processed than there are rows in the array (step 602), the system can divide the sets of activation inputs into portions so that each portion has a size less than or equal to a number of rows in the array (step 606).

The system then can generate, for each portion of activation inputs, a portion of accumulated values (step 608). An accumulated value can be a sum of products of activation and weight inputs to cells along a given column, e.g., as described in systolic array 306 of FIG. 3. Each portion of accumulated values can be stored in a buffer until all portions of activation inputs have been processed. The buffer can be a buffer in accumulator units 310 of FIG. 3, a buffer in the systolic array, or the unified buffer 208 of FIG. 2.

The system can then combine all portions of accumulated values into a vector of accumulated values (step 610). In particular, the system can access the buffer of previously stored portions of accumulated values and accumulate, e.g., using accumulator units 310 of FIG. 3, the accumulated values to generate a vector of the accumulated values. The system can send the vector of the accumulated values to a vector computation unit, e.g., the vector computation unit 214 of FIG. 2.

For example, if there are 256 rows in the array and there are 300 sets of activation inputs to process at a given layer, the system can generate 256 final accumulated values from 256 sets of activation inputs for complete utilization of the systolic array and store the 256 final accumulated values in a buffer. The system can then generate 44 final accumulated values from the 44 remainder sets of activation inputs. Finally, the system can combine all 300 final accumulated values to form a vector and send the vector to the vector computation unit.

If there are more sets of weight inputs than columns to the array, the system can perform similar operations. That is, the system can divide the sets of weight inputs into portions having fewer sets of weight inputs than a number of columns in the array, generate accumulated values for each portion, and combine the accumulated values into a vector for use in the vector computation unit. In some implementations, instead of comparing the number of sets of weight inputs with the number of columns in the array, the system can compare the number of accumulated values with the number of columns in the array.

Although the system has been described with weight inputs being transferred to columns of the array and activation inputs being transferred to rows of the array, in some implementations, the weight inputs are transferred to rows of the array and the activation inputs are transferred to columns of the array.

Although the hardware is described to be for computing inferences, the hardware can be used for one or more of the following: convolutional or fully-connected neural network training, linear or logistic regression, clustering, e.g., k-means clustering, video-encoding, and image processing.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A circuit for performing neural network computations for a neural network comprising a plurality of neural network layers, the circuit comprising:
   a matrix computation unit configured to, for each of the plurality of neural network layers:
      receive a plurality of weight inputs and a plurality of activation inputs for the neural network layer, and
      generate a plurality of accumulated values based on the plurality of weight inputs and the plurality of activation inputs,
      wherein the matrix computation unit is configured as a two-dimensional array comprising a plurality of cells, wherein the plurality of weight inputs is shifted through cells along a first dimension of the two-dimensional array, and wherein the plurality of activation inputs is shifted through cells along a second dimension of the two-dimensional array; and
   a vector computation unit configured to, for each of the plurality of neural network layers:
      apply an activation function to each of the plurality of accumulated values for the neural network layer generated by the matrix computation unit to generate a plurality of activated values for the neural network layer.

2. The circuit of claim 1, wherein the first dimension is different from the second dimension.

3. The circuit of claim 1, wherein the circuit is configured to:
   receive instructions from a host;
   convert the instructions to control signals; and
   provide the control signals to the vector computation unit and the matrix computation unit to perform the neural network computations.

4. The circuit of claim 3 wherein the circuit is configured to:
   use the timing of clock signals to send the control signals to one or more components of the circuit; and
   regulate dataflow in the circuit based on the timing of the clock signals.

5. The circuit of claim 1, wherein the matrix computation unit is configured to:
   using respective circuitry in at least two distinct cells of the plurality of cells, process the plurality of weight inputs and the plurality of activation inputs to generate the plurality of accumulated values for the neural network layer.

6. The circuit of claim 1, wherein the matrix computation unit comprises:
   multiplication circuitry in each cell of the plurality of cells of the two-dimensional array, the multiplication circuitry being configured to multiply an activation input and a weight input to generate a product; and
   an accumulator unit coupled to a cell along a dimension of the two-dimensional array, the accumulator unit being configured to accumulate values that are based on products generated by multiplication circuitry in one or more cells along the dimension of the two-dimensional array.

7. The circuit of claim 6, wherein the matrix computation unit comprises:
   a weight register in each cell of the plurality of cells of the two-dimensional array, the weight register being configured to store a weight input of the plurality of weight inputs.

8. The circuit of claim 6, wherein the matrix computation unit is configured to perform a plurality of multiply-accumulate operations at least by:
   using multiplication circuitry in the matrix computation unit to perform a plurality of multiplication operations between the plurality of activation inputs and the plurality of weight inputs; and
   using the accumulator unit to generate the plurality of accumulated values based on the multiplication operations between the plurality of activation inputs and the plurality of weight inputs.

9. The circuit of claim 1, wherein the vector computation unit comprises:
   respective computation units that are each configured to perform arithmetic operations; and
   each of the respective computation units are configured to be controlled at the circuit using control signals received by the vector computation unit.

10. The circuit of claim 9, wherein the vector computation unit comprises:
    an activation unit configured to apply the activation function to an accumulated value of the plurality of accumulated values for the neural network layer to generate an activated value of the plurality of activated values for the neural network layer.

11. The circuit of claim 9, wherein the vector computation unit comprises:
    a normalization unit configured to normalize the plurality of activated values for the neural network layer to generate a plurality of normalized values from the plurality of activated values.

12. The circuit of claim 1, wherein the activation function is a non-linear function.

13. A method for performing neural network computations for a neural network comprising a plurality of neural network layers using a circuit comprising a matrix computation unit and a vector computation unit, wherein the method comprises, for each of the plurality of neural network layers:

receiving, by the matrix computation unit, a plurality of weight inputs and a plurality of activation inputs for the neural network layer, wherein the matrix computation unit is configured as a two-dimensional array comprising a plurality of cells;

shifting the plurality of weight inputs through cells along a first dimension of the two-dimensional array;

shifting the plurality of activation inputs through cells along a second dimension of the two-dimensional array;

generating a plurality of accumulated values based on the plurality of weight inputs that are shifted through cells along the first dimension and the plurality of activation inputs that are shifted through cells along the second dimension; and applying, by the vector computation unit, an activation function to each of the plurality of accumulated values generated by the matrix computation unit to generate a plurality of activated values for the neural network layer.

14. The method of claim 13, wherein the first dimension is different from the second dimension.

15. The method of claim 13, further comprising:
receiving instructions from a host;
converting the instructions to control signals; and
providing the control signals to the vector computation unit and the matrix computation unit to perform the neural network computations.

16. The method of claim 15, further comprising:
sending the control signals to one or more components of the circuit using the timing of clock signals; and
regulating dataflow in the circuit based on the timing of the clock signals.

17. The method of claim 13, further comprising:
processing, using respective circuitry in at least two distinct cells of the plurality of cells, the plurality of weight inputs and the plurality of activation inputs to generate the plurality of accumulated values for the neural network layer.

18. The method of claim 13, wherein the matrix computation unit comprises multiplication circuitry in each cell of the plurality of cells and an accumulator unit coupled to a cell along a dimension of the two-dimensional array, and the method comprises:

multiplying, using the multiplication circuitry, an activation input and a weight input to generate a product; and accumulating, using the accumulator unit, values that are based on products generated by multiplication circuitry in one or more cells along the dimension of the two-dimensional array.

19. The method of claim 18, wherein the matrix computation unit comprises a weight register in each cell of the plurality of cells and the method comprises:

storing a weight input of the plurality of weight inputs in at least one weight register in a cell of the matrix computation unit.

20. The method of claim 18, wherein the matrix computation unit is configured to perform a plurality of multiply-accumulate operations and the method comprises:

performing, using multiplication circuitry in the matrix computation unit, a plurality of multiplication operations between the plurality of activation inputs and the plurality of weight inputs; and generating, using the accumulator unit, the plurality of accumulated values based on the multiplication operations between the plurality of activation inputs and the plurality of weight inputs.

21. The method of claim 13, further comprising:
performing arithmetic operations using a respective computation unit in the vector computation unit; and
wherein each of the respective computation units are configured to be controlled at the circuit using control signals received by the vector computation unit.

22. The method of claim 21, wherein the vector computation unit comprises an activation unit and the applying the activation function comprises:
applying the activation function using the activation unit of the vector computation unit.

23. The method of claim 21, wherein the vector computation unit comprises a normalization unit and the method comprises:
normalizing the plurality of activated values for the neural network layer using the normalization unit of the vector computation unit.

24. A non-transitory machine-readable storage device for storing instructions for performing neural network computations for a neural network comprising a plurality of neural network layers and using a circuit comprising a matrix computation unit and a vector computation unit, wherein the instructions are executable by a processing device to cause performance of operations comprising:

receiving, by the matrix computation unit, a plurality of weight inputs and a plurality of activation inputs for the neural network layer, wherein the matrix computation unit is configured as a two-dimensional array comprising a plurality of cells;

shifting the plurality of weight inputs through cells along a first dimension of the two-dimensional array;

shifting the plurality of activation inputs through cells along a second dimension of the two-dimensional array;

generating a plurality of accumulated values based on the plurality of weight inputs that are shifted through cells along the first dimension and the plurality of activation inputs that are shifted through cells along the second dimension; and applying, by the vector computation unit, an activation function to each of the plurality of accumulated values generated by the matrix computation unit to generate a plurality of activated values for the neural network layer.

* * * * *